United States Patent [19]

Merritt

[11] 4,264,878
[45] Apr. 28, 1981

[54] CO CHEMICAL LASER PRODUCED BY LASER INDUCED CHEMISTRY OF CSCL$_2$

[75] Inventor: James A. Merritt, Pulaski, Tenn.

[73] Assignee: The United States of America as represented by the Secretary of the Army, Washington, D.C.

[21] Appl. No.: 52,045

[22] Filed: Jun. 25, 1979

[51] Int. Cl.$^3$ ............................................. H01S 3/223
[52] U.S. Cl. .............................................. 331/94.5 G
[58] Field of Search ................................... 331/94.5 G

[56] References Cited

U.S. PATENT DOCUMENTS 4,099,138 7/1978 Jeffers et al. .................. 331/94.5 G

OTHER PUBLICATIONS

"Thermochemical Generation of CS and S for CO Chemical Lasers", by Richardson et al.; *Jour. of App. Phys.*, vol. 48, No. 6 (Jun. '77) pp. 2509–2514.
"Thermochemical Generation of CS for CO Chemical Lasers" by Buonadonna et al.; *AIAA Journal*, vol. 14, No. 8, pp. 1106–1110 (Aug. '76).
"Combustor-driven laser" by Richardson et al.; *Laser Focus* (Jun. '78) pp. 50–54.
"Dynamics of the CS$_2$–O$_2$ Flame" by Howgrate et al.; Jour. of Chem. Phys., vol. 59, No. 6 (Sep. '73) p. 2815.

*Primary Examiner*—William L. Sikes
*Assistant Examiner*—Leon Scott, Jr.
*Attorney, Agent, or Firm*—Nathan Edelberg; Robert P. Gibson; Jack W. Voigt

[57] ABSTRACT

The $R_{(48)}$(992 cm$^{-1}$) line of a tunable cw multiline CO$_2$ laser is used to dissociate thiophosgene (CSCl$_2$) to produce the excited radical, CS*, homogenously in a laser chamber containing premixed O$_2$. The $R_{(48)}$(992 cm$^{-1}$) line of the CO$_2$ laser is resonant with the 2$\nu_2$ (992 cm$^{-1}$) overtone of CSCl$_2$. This line is strongly absorbed by the CSCl$_2$ which dissociates (80%) into 2 Cl and CS*. The CS* reacts with the premixed O$_2$ to chemically produce excited CO which subsequently lases.

2 Claims, 1 Drawing Figure

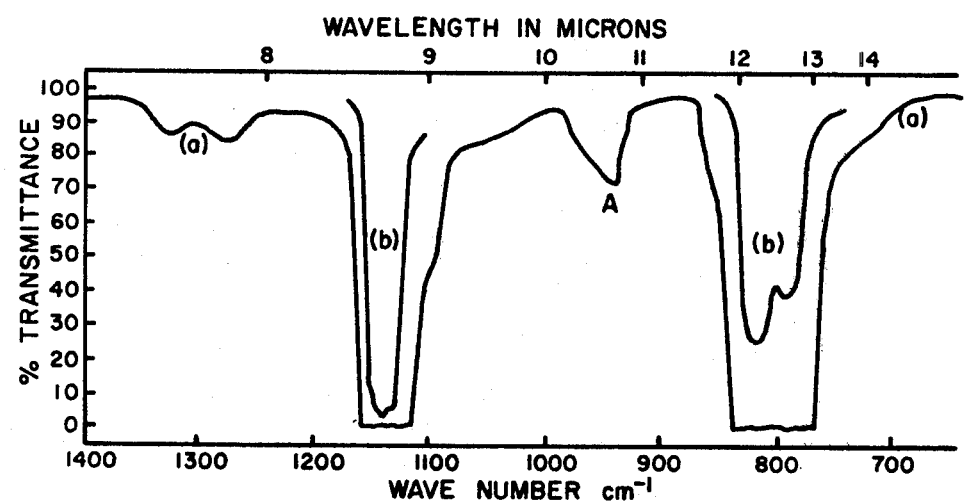

CO CHEMICAL LASER PRODUCED BY LASER INDUCED CHEMISTRY OF $CSCL_2$

DEDICATORY CLAUSE

The invention described herein may be manufactured, used, and licensed by or for the Government for governmental purpose without the payment to me of any royalties thereon.

BACKGROUND OF THE INVENTION

Present techniques used to produce a CO chemical laser involve reacting $O_2 + CS_2$ or decomposing $CS_2$ in presence of $CO_2$. These reactions have complex chemical kinetics and high transfer of energy to the reaction medium producing high temperatures and inefficient amounts of excited CO to lase. Also, any unreacted $CS_2$ present produces fairly strong relaxation of the CO. No lasing has been observed below $\sim V=10$ of the CO molecule in an uncooled chamber. This gives a frequency $\geq 5.3$ $\mu$m. When techniques are used to cool the lasing chamber then somewhat lower vibrational levels are involved in the lasing, but even then the lowest vibrational level is $\geq 4$ and the frequency is $\geq 5$ $\mu$m.

Advantageous would be a method to produce an excited radical which is reactive with a gaseous premixed reactant species to produce a vibrational excited compound that lases. A particular advantage is recognized for a method whereby the disadvantages of high temperature reactions are obviated by making a system operable at room temperature. The advantages of lasing at room temperature after meeting the requirements of obtaining homogeneity of the premixed reactant species are therefore numerous.

Therefore, an object of this invention is to provide an admixture which can be premixed at room temperature after proper conditioning of the system which is not reactive until the admixture is irradiated with a $CO_2$ laser thereby causing a dissociation reaction.

A further object of this invention is to provide a chemical CO laser that is obtained by irradiating a mixture of $CSCl_2 + O_2$ in a laser cavity which effects the dissociation of $CSCl_2$ to produce the CS* radical in an excited state which subsequently reacts with the $O_2$ present to produce CO in an excited vibrational state which lases.

SUMMARY OF THE INVENTION

A cw $CO_2$ multiline laser operating at a power level of about 100 watts is employed as a source of radiation to irradiate a room temperature mixture of $CSCl_2$ and $O_2$ in a predetermined pressure range from about 15 to about 100 torr.

The specified gases in admixture are metered into a properly conditioned laser cell (e.g., a one meter lasing chamber stainless steel cell, prior cleaned, evacuated, and fitted with proper windows, mirrors, and coupling arrangement) to achieve a predetermined pressure and subsequently exposed to cw $CO_2$ multiline laser radiation for a predetermined time to effect dissociation of $CSCl_2$. The $CSCl_2$ is dissociated by resonant laser radiation. The $R_{(48)}$ (992 cm$^{-1}$) line of the $CO_2$ laser is resonant with the $2\nu_2$ (992 cm$^{-1}$) overtone band of $CSCl_2$. This line is strongly absorbed by the $CSCl_2$ which dissociates into 2 Cl and CS*. The CS* reacts with the premixed $O_2$ to chemically produce excited CO which subsequently lases.

BRIEF DESCRIPTION OF THE DRAWING

The FIGURE of the drawing is an infrared spectra of $CSCl_2$ wherein the percent transmittance is shown on the ordinate and the wave number (cm$^{-1}$) and wavelength in microns are shown on the abscissa.

DESCRIPTION OF THE PREFERRED EMBODIMENTS

An admixture of $CSCl_2$ and $O_2$ at a predetermined pressure from about 15 torr to about 100 torr is irradiated in a laser cell to effect dissociation of $CSCl_2$. The dissociation product, CS* radical (in an excited state), immediately reacts with $O_2$ to form CO. The CO in the excited vibrational state lases.

The predetermined power level of the cw $CO_2$ multiline laser of about 100 watts and an irradiating time period of about one second effects dissociation of $CSCl_2$. The 992 cm$^{-1}$ $2\nu_2$ overtone vibrational band of $CSCl_2$ is resonant with the $R_{(48)}$ (992 cm$^{-1}$) radiation of the $CO_2$ laser. The 992 cm$^{-1}$ $2\nu_2$ overtone vibrational band is designated as "A" on the figure of the drawing which depicts the $CSCl_2$ infrared spectra of 80 torr, curve (a), and 3 torr, curve (b) pressure.

The laser dissociation of $CSCl_2$ to generate CS* radical in the presence of oxygen is an effective method to produce CO lasing. Particularly attractive is the fact that $CSCl_2$ and oxygen can be premixed to provide an available source for the CS* radical once the $CSCl_2$ is irradiated to produce it, and the other reactant, $O_2$, with which the CS* radical reacts immediately to form CO which lases.

A preferred combination for the described one meter lasing chamber employed a pressure mixture of 15 torr $CSCl_2$ and 15 torr $O_2$. The power level of the $CO_2$ laser was at 100 watts, and the irradiation time was about 1 second to produce CS* which immediately reacted with $O_2$ to form CO which lased.

This invention method is adaptable for use with higher laser power irradiation for smaller or larger systems. Also, the laser cavity wherein the dissociation and laser action takes place should be adaptable for chemical or mechanical pumping. A cartridge or canister admixture of the $CSCl_2$ and $O_2$ for charging the laser cavity and a chemical pumping means for maintaining the proper conditions in the laser cavity should provide mobile CO lasing capability for the user.

Other gaseous sources of the oxygen atom which are reactive with the excited radical CS* to form vibrationally excited CO can be used to replace the $O_2$ molecule. Such gaseous sources are selected on the basis of system compatibility and other requirements of system which would include chemical and/or mechanical pumping capability to maintain proper pressure in laser cavity.

I claim:

1. A method for the production of the excited radical, CS*, by irradiating $CSCl_2$ in admixture with $O_2$ to produce CO in an excited vibrational state which lases, and method comprising:

(i) preparing a homogeneous admixture of $CSCl_2$ and $O_2$;

(ii) metering said admixture of $CSCl_2$ and $O_2$ into a properly conditioned laser cell to achieve a predetermined pressure from about 15 to about 100 torr; and (iii) irradiating said admixture of $CSCl_2$ and $O_2$ for a predetermined time period with the $R_{(48)}$ (992 cm$^{-1}$) line of a tunable cw $CO_2$ multiline laser operating at a predetermined power level to effect dissociation of $CSCl_2$ to produce the excited radical, CS*, which immediately react with $O_2$ present to produce CO in an excited vibrational state which lases.

2. The method of claim 1 wherein said predetermined pressure of said $CSCl_2$ and said $O_2$ is about 15 torr each in said admixture; said predetermined power level of said tunable cw $CO_2$ multiline laser is about 100 watts; and wherein said predetermined time of irradiating is about one second.

* * * * *